United States Patent [19]
Wierer et al.

[11] Patent Number: 5,614,256
[45] Date of Patent: Mar. 25, 1997

[54] COATING COMPOSITION FOR PRODUCING WATERTIGHT, VAPOR-PERMEABLE AND FLAME-RETARDANT COATINGS

[75] Inventors: Konrad A. Wierer, Sengkofen, Germany; Franco Serafini, Lendelange, Luxembourg

[73] Assignees: Wacker-Chemie GmbH, Munich, Germany; Dupont de Nemours Intl. S.A., Geneva, Switzerland

[21] Appl. No.: 517,807

[22] Filed: Aug. 22, 1995

Related U.S. Application Data

[60] Continuation of Ser. No. 209,192, Mar. 10, 1994, abandoned, which is a division of Ser. No. 919,177, Jul. 23, 1992, Pat. No. 5,314,530.

[30] Foreign Application Priority Data

Jul. 24, 1991 [DE] Germany ........................ 41 24 560.1

[51] Int. Cl.$^6$ ................................ B05D 3/12; B05D 3/02
[52] U.S. Cl. ........................ 427/244; 427/366; 427/393.3; 427/393.4; 427/412; 427/381
[58] Field of Search .............................. 427/393.3, 244, 427/366, 393.4, 412, 381

[56] References Cited

U.S. PATENT DOCUMENTS

| | | | |
|---|---|---|---|
| 2,758,036 | 8/1956 | Cyr | 427/211 |
| 3,607,341 | 9/1971 | Goins et al. | 427/373 |
| 4,162,342 | 7/1979 | Schwartz | 427/244 |
| 4,176,108 | 11/1979 | Caimi et al. | 427/381 |
| 4,185,133 | 1/1980 | Woerner et al. | 427/381 |
| 4,265,965 | 5/1981 | Chancler | 427/244 |
| 4,303,456 | 12/1981 | Schmuck et al. | 427/244 |
| 4,562,097 | 12/1985 | Walter et al. | 427/244 |
| 4,661,399 | 4/1987 | Anderson, Jr. et al. | 427/211 |
| 4,686,135 | 8/1987 | Obayashi et al. | 427/489 |
| 4,774,107 | 9/1988 | von Kwiatkowski et al. | 427/211 |
| 5,019,422 | 5/1991 | Rose et al. | 427/245 |
| 5,091,243 | 2/1992 | Tolbert et al. | 427/393.3 |
| 5,137,678 | 8/1992 | Hess et al. | 427/366 |
| 5,399,419 | 3/1995 | Porter et al. | 427/366 |
| 5,460,873 | 10/1995 | Ogawa et al. | 427/412 |

FOREIGN PATENT DOCUMENTS 0109928  1/1991  European Pat. Off. .

*Primary Examiner*—Diana Dudash
*Attorney, Agent, or Firm*—Burgess, Ryan & Wayne

[57] ABSTRACT

The invention relates to coating compositions for producing watertight, vapor-permeable and flame-retardant coatings, comprising a vinyl chloride copolymer or vinyl acetate/ethylene dispersion, flameproofing agents, foam stabilizer and optionally crosslinkers. The invention further relates to a process for producing watertight, vapor-permeable and flame-retardant coatings by mechanically foaming the coating composition to produce a stable foam, applying the foam to a woven, knitted or nonwoven support material on one or both of the sides and drying it at a temperature of from 60° to 180° C. and optionally, after drying, compressing the foam layer. The textile support materials coated with the coating composition are suitable for use in building protection and in the geotextile sector.

15 Claims, No Drawings

COATING COMPOSITION FOR PRODUCING WATERTIGHT, VAPOR-PERMEABLE AND FLAME-RETARDANT COATINGS

This application is a continuation, of application Ser. No. 08/209,192, filed Mar. 10, 1994, now abandoned which is a division, of application Ser. No. 919,177, filed Jul. 23, 1992, now U.S. Pat. No. 5,314,530.

BACKGROUND OF THE INVENTION (1) Field of the Invention

The present invention concerns coating com positions for producing watertight, vapor-permeable and flame-retardant coatings, processes for manufacturing textile support materials coated therewith, textile support materials coated with the coating composition, and use thereof.

(2) Description of the Related Art

To protect buildings from the ingress of water spunbonded web materials composed of polypropylene fiber, polyester fiber or glass fiber have been coated with bitumen and similar tar products in order to obtain tear-resistant, water-repellant sheeting materials. The disadvantage of these materials is the low watertightness (a hydrostatic head of 200 mm according to DIN 53886) is coupled with a similarly low water vapor permeability (100 g/m$^2$×day) according to DIN 53122/1).

EP-A-64 630 discloses flame-resistant, halogen-free molding materials based on ethylene copolymers, bitumen, red phosphorus and Al(OH)$_3$ which can be used for manufacturing sealing sheets.

EP-B-18 691 U.S. Pat. No. 4 452 850) discloses roofing felts comprising a fabric coated on both sides with PVC. The disadvantages of this coating are the very low water vapor permeability of 8 m$^2$/g×day and the plasticizer migration.

DE-A-3 200 824 likewise concerns textile support materials coated with plasticizer-containing PVC, which have the abovementioned disadvantages. For flame resistance the fabrics used were made of polyester fiber modified to be flame-resistant.

DE-A-2 124 036 (CA-A-924 037) describes a low-flammability preparation comprising an ethylene/vinyl chloride/acrylamide copolymer and an ammonium polyphosphate, which can be used as binder for impregnating fiber webs.

DE-A-2 452 369 (CA-A-1 052 924) describes flame-resistant polymer lattices based on vinyl chloride/α-olefin/bishydrocarbyl vinylphosphonate, which can be used for coating fiber webs, inter alia. The coated fiber webs are likely to have only a low water vapor permeability.

DE-A-3 017 019 (U.S. Pat. No. 4 288 486) describes a sheetlike cover material based on a glass fiber mat which has been covered on at least one surface with a layer of mechanically foamed and then melted and compressed vinyl polymer (preferably polyvinyl chloride).

EP-A-176 849 (AU-A-8 547 976) mentions that, to improve the flame-resistant effect, inorganic solid particles can be incorporated into the support sheets for roofing felts. The action of these particles is based on the formation of a firm, skeletal carbonizing layer. The coating is designed to prevent the burning of holes into the roofing felt by flying embers.

It is an object of the present invention to make available a coating composition which is suitable for producing flame-retardant coatings, in particular on textile support materials, combining high water tightness with high vapor permeability. It is a further object to make available a process for manufacturing textiles coated therewith which shall combine a low basis weight and a high mechanical strength with the abovementioned requirements profile concerning flame resistance, water-tightness and vapor permeability.

SUMMARY OF THE INVENTION

The invention accordingly provides a coating composition for producing watertight, vapor-permeable and flame-retardant coatings, comprising A) an aqueous dispersion having a solids content of from 30 to 70% by weight of a vinyl chloride copolymer with from 20 to 90% by weight of vinyl chloride, based on the total weight of the copolymer, from 10 to 80% by weight, based on the total weight of the copolymer, of one or more comonomers from the group of the (meth-)acrylic esters of alcohols of from 1 to 10 carbon atoms, the vinyl esters of saturated aliphatic carboxylic acids of from 2 to 10 carbon atoms, and the α-olefins, and from 0 to 10% by weight, based on the total weight of the copolymer, of one or more ethylenically unsaturated functional comonomers, or an aqueous dispersion having a solids content of from 30 to 70% by weight of a vinyl acetate-ethylene copolymer with from 10 to 40% by weight of ethylene, based on the total weight of the copolymer, and from 0 to 10% by weight, based on the total weight of the copolymer, of one or more ethylenically unsaturated functional comonomers, B) from 5 to 70% by weight, based on the solids content of the copolymer dispersion, of a flameproofing agent from the group of the antimony oxides, phosphoric esters, zinc borates, metallic oxide hydrates, metal hydroxides or chloroparaffins, C) from 0 to 20% by weight, based on the solids content of the copolymer dispersion, of a crosslinker, D) from 0.5 to 20% by weight, based on the solids content of the copolymer dispersion, of a foam stabilizer, and E) from 0 to 10% by weight, based on the solids content of the copolymer dispersion, of a thickener.

The present invention furthermore provides a process for manufacturing watertight, vapor-permeable and flame-retardant coated support materials, comprising the steps of a) foaming the abovementioned coating composition by mechanical means with or without a crosslinker and/or a thickener into a stable foam, b) applying the foam to the woven, knitted or nonwoven support material on one or both sides and drying at a temperature of from 60° to 180° C., and c) optionally, after drying, compressing the foam layer,

DESCRIPTION OF THE PREFERRED EMBODIMENT

Preferred comonomers for the vinyl chloride copolymers are from the group of the methacrylic esters or acrylic esters of alcohols of from 1 to 10 carbon atoms: methyl methacrylate, methyl acrylate, ethyl methacrylate, ethyl acrylate, isopropyl methacrylate, isopropyl acrylate, tert-butyl acrylate, n-butyl acrylate and ethylhexyl acrylate; from the group of the vinyl esters of saturated aliphatic carboxylic acids of from 2 to 10 carbon atoms: vinyl acetate, isopropenyl acetate, vinyl propionate, vinyl laurate and vinyl esters of Versatic acid ® of 9 or 10 carbon atoms (vinyl esters of saturated α-branched monocarboxylic acids, commercial product from Shell); and from the group of the olefins: ethylene.

If desired, the copolymers of the invention may additionally contain as base monomers up to 10% by weight, based on the copolymer, of ethylenically unsaturated, functional comonomers. Examples thereof are mono- or dicarboxylic acids such as methacrylic acid, acrylic acid or fumaric acid and amides thereof, hydroxyl-functional monomers such as hydroxyethyl acrylate, 2-hydroxypropyl acrylate or N-methylol(meth)acrylamide, and also sulfonate-functional monomers such as vinyl sulfonate or methacrylamidopropanesulfonic acid. Preference is given to using from 1 to 5% by weight of N-methylol(meth)acrylamide, based on the VC or VAcE copolymer.

Particularly preferred copolymers A are copolymers based on vinyl chloride-ethylene copolymers with an ethylene content of preferably 10–50% by weight and a vinyl chloride content of from 50 to 90% by weight, each percentage being based on the total weight of copolymer A;

copolymers based on vinyl chloride-vinyl easter copolymers, in particular vinyl chloride-vinyl acetate copolymers, with a vinyl chloride content of preferably 20–50% by weight and a vinyl ester content of from 50 to 80% by weight, each percentage being based on the total weight of copolymer A;

copolymers based on vinyl chloride-vinyl ester-ethylene copolymers, in particular vinyl chloride-vinyl acetate-ethylene copolymers with a vinyl chloride content of from 50 to 70% by weight, a vinyl acetate content of from 10 to 30% by weight and an ethylene content of from 5 to 15% by weight, each percentage being based on the total weight of copolymer A;

copolymers based on vinyl chloride-vinyl ester-(meth)acrylic ester copolymers having a vinyl chloride content of from 20 to 50% by weight, a vinyl ester content of from 50 to 80% by weight and a (meth)acrylic ester content of from 5 to 20% by weight, in particular copolymers with butyl acrylate, methyl methacrylate and/or ethylhexyl acrylate;

copolymers based on said vinyl chloride/ethylene, vinyl acetate/ethylene, vinyl chloride/vinyl ester and vinyl chloride/vinyl ester/(meth)acrylate polymers containing up to 10% by weight of N-methylol(meth)acrylamide, acrylic acid, vinyl sulfonate and/or 2-hydroxypropyl acrylate, in particular vinyl chloride-ethylene-N-methylolmethacrylamide copolymers with a vinyl chloride content of from 60 to 90% by weight, an ethylene content of from 10 to 40% by weight and an N-methylolmethacrylamide content of from 1 to 5% by weight, each percentage being based on the total weight of copolymer A. In each case the weight percentages add up to 100% by weight in the copolymer.

The most preferred copolymers A are copolymers based on vinyl chloride-ethylene copolymers with an ethylene content of from 10 to 40% by weight and a vinyl chloride content of from 60 to 90% by weight, each percentage being based on the total weight of copolymer A.

The preparation of the aqueous copolymer dispersions is preferably effected by the emulsion polymerization process and is carried out in customary polymerization vessels. The polymerization can be carried out batchwise or continuously with or without the use of seed lattices, with all or individual constituents of the reaction mixture being present from the start or with a fraction of the reaction mixture being present from the start and the remainder being added, or entirely by metering, without initial charge. The rate of addition of a component preferably corresponds to the rate of consumption of this component.

The emulsion polymerization is carried out within the temperature range from 0° to 100° C. and is initiated in a customary manner for an emulsion polymerization. The initiators used are the usual water-soluble free-radical formers, which are preferably employed in amounts of from 0.01 to 3.0% by weight, based on the total weight of monomer. Examples are ammonium persulfate, potassium persulfate, ammonium peroxodisulfate, potassium peroxodisulfate; hydrogen peroxide; alkyl hydroperoxides, such as tert-butyl hydroperoxide; potassium peroxodiphosphate, sodium peroxodiphosphate, ammonium peroxodiphosphate; azo compounds, such as azobisisobutyronitrile or azobiscyanovaleric acid. If desired, the free-radical initiators mentioned may also be combined in a conventional manner with from 0.01 to 0.5% by weight, based on the total weight of monomer, of reducing agents. Suitable reducing agents are for example alkali metal formaldehydesulfoxylates. This redox initiation is preferably carried out by adding one or both of the redox catalyst components during the polymerization.

Suitable dispersants include all the emulsifiers and protective colloids customarily used in emulsion polymerization. Preference is given to using from 1 to 6% by weight, based on the total weight of monomer, of emulsifier. Suitable emulsifiers are for example anionic surfactants, such as alkyl sulfates having a chain length of from 8 to 18 carbon atoms, alkyl and alkylaryl ether sulfates having from 8 to 18 carbon atoms in the hydrophobic moiety and up to 40 ethylene or propylene oxide units, alkyl- or alkyl-aryl-sulfonates of from 8 to 18 carbon atoms, esters and half-esters of sulfosuccinic acid with monohydric alcohols or alkylphenols. Suitable nonionic surfactants are for example alkyl polyglycol ethers or alkylaryl polyglycol ethers containing from 8 to 40 ethylene oxide units.

If desired, it is possible to use protective colloids, preferably in amounts of up to 15% by weight, based on the total weight of monomer. Examples of protective colloids are vinyl alcohol/vinyl acetate copolymers containing from 80 to 100 mol % of vinyl alcohol units, polyvinylpyrrolidones having a molecular weight of from 5,000 to 400,000, and hydroxyethylcelluloses having a degree of substitution range from 1.5 to 3.

The desired pH range for the polymerization, which in general extends from 2.5 to 10, preferably from 3 to 8, can be obtained in a known manner using acids, bases or customary buffer salts, such as alkali metal phosphates or alkali metal carbonates. To control the molecular weight it is possible to add the regulators customarily used in this form of polymerization, for example mercaptans, aldehydes and chlorocarbons.

Suitable flameproofing agents B) are for example antimony trioxide $Sb_2O_3$, antimony pentoxide $Sb_2O_5$, aluminum oxide hydrate $Al_2O_3 \times 3H_2O$, zinc borate $Zn(BO_2)_2 \times 2H_2O$ or $2ZnO \times (B_2O_3) \times (H_2O)_{3.5}$, ammonium orthophosphate or polyphosphate $NH_4H_2PO_4$ or $(NH_4PO_3)_n$, and also chloroparaffins. Preference is given to using aluminum oxide hydrate, particularly preferably in an amount of from 20 to 50%, based on the solids content of a copolymer dispersion. If a vinyl acetate/ethylene copolymer dispersion is used in the coating composition, it is preferable to use chloroparaffins, in particular chlorinated hydrocarbons having a chlorine content of from 40 to 60% by weight.

In a preferred embodiment, the coating composition of the invention additionally contains from 2 to 7% by weight, based on the solids content of the copolymer dispersion, of a crosslinker, preferably from the group of the melamine resins, the phenol-formaldehyde resins and the urea-formaldehyde resins, which is added in powder form or preferably in the form of the aqueous solutions of the curable starting condensates. Particular preference is given to the starting condensates of melamine-formaldehyde resins.

In a preferred embodiment the coating composition contains foam stabilizers in an amount of from 2 to 15% by weight, based on the solids content of the copolymer dispersion. Suitable surface-active agents are the salts of higher alkyl sulfates, alkylbenzenesulfonates, dialkyl sulfosuccinates, polyoxyethylene alkylphenyl ethers, polyoxyethylene acyl esters or fatty acid salts. Particular preference is given to alkylbenzenesulfonates, alkyl sulfates and salts of mixtures of fatty acids of different chain lengths, in particular the ammonium salts of fatty acids.

To improve the stability of the foam when the coating composition is applied and dried in the form of a foam it is also possible to add organic thickeners. Preference is given to using polyvinyl alcohols, water-soluble cellulose derivatives such as methylcellulose, methylhydroxyethylcellulose, hydroxyethylcellulose and hydropropylcellulose, polyurethanes and also polyvinylpyrrolidones and ammonium salts of polyacrylic acids. Particular preference is given to using the ammonium salts of polyacrylic acid.

The coating composition may further contain additives such as pigments or agents for improving the watertightness, such as paraffin oils in amounts of up to 60% by weight, silicones in amounts of up to 3% by weight or fluorocarbons in amounts of up to 3% by weight, each percentage being based on the solids content of the copolymer dispersion. If necessary, it is also possible to add red phosphorus, preferably in amounts of from 5 to 100% by weight, based on the solids content of the copolymer dispersion, to improve the flame resistance.

The viscosity of the coating composition is preferably set to 500–3000 mPas (Brookfield, 20 rpm, room temperature) by adding thickeners and/or water.

The coating composition is preferably prepared by adding the optional crosslinker C) and the optional thickener E) to the copolymer dispersion A) with stirring. The foam stabilizer D) is added last.

The coating composition of the invention is suitable for coating woven, knitted or nonwoven textile support materials for the purpose of rendering them watertight, vapor-permeable and flame-retardant. The support materials are preferably made of synthetic fibers. Examples thereof are polyethylene, polypropylene, polyester and glass fibers. Particular preference is given to as-produced webs, in particular spunbonded webs, composed of the synthetic fibers mentioned and having a basis weight of from 50 to 300 g/m².

The coating composition is applied to the support material in the form of a foam, since this appreciably improves the vapor permeability. The foam is produced mechanically after the foam stabilizer and optionally a thickener and further additives have been added. The mechanical foaming can be effected in a foam mixer by the application of high shearing forces. Another possibility is to create the foam in a foam generator by the injection of compressed air. Preference is given to foaming by means of a foam generator.

The foamed coating composition is then applied to the support material using conventional coating means, for example a spreader doctor or other foam applicators. The foam can be applied on one or both of the sides; it is preferably applied to both sides. The application rate per side ranges from 20 to 150 g/m², in particular from 50 to 90 g/m². Rates below 20 g/m² ensure good vapor permeability at low cost, but the flame resistance and the watertightness are poor. At rates above 150 g/m² cracks appear in the course of drying.

After the foam has been applied it is dried in a slow air stream in a drying duct, for example by means of infrared heating, with a temperature gradient from 60 rising to 180° C., preferably from 60 rising to 130° C.

To improve the flame resistance, a preferred embodiment comprises applying the foam on both sides in a thickness of from 0.3 to 1.0 mm. Particular preference is given to applying the foam to the two surfaces of the support material in different thicknesses. In the last embodiment, the foam is applied to the underside of the support material in a thin layer of not more than 0.4 mm in thickness, preferably by means of an air knife, in such a way that it penetrates very deeply into the spaces between the fibers of the web. On the upper surface, by contrast, the foam is applied for the purpose of improving the watertightness, preferably by means of a roller doctor, in particular in a thickness of from 0.3 to 1.0 mm.

In a particularly preferred embodiment, resulting in improved abrasion resistance, flame resistance and watertightness, the dried layer of foam is compressed, forcing it to some extent into the web. The compressing can be effected for example by hot calendering within the temperature range from 100° to 180° C. under a nip pressure of from 2 to 300 daN/cm, it being advantageous to carry out the hot calendering between 2 smooth rolls, one made of steel and the other of a softer material, for example polyamide or rubber. In particular, only the foam layer on the upper surface of the textile support material is compressed. If desired, a further improvement in the watertightness and the abrasion resistance can be achieved by applying a further coat, preferably at a rate of from 5 to 30 g/m², of unfoamed copolymer dispersion.

The process of the invention produces in the case of the preferred foam application route, for example on polypropylene webs, materials possessing a very high watertightness (DIN 53886:>300 mm hydrostatic head), a very high water vapor permeability (DIN 53122/1:>350 g/m²×d) and an excellent flame retardance to DIN 4012 B2.

The textile support materials coated with the coating composition of the invention are suitable for use in building protection as roofing or sealing felts, for example underneath roof tiles or behind exterior walls made of wood. They are also suitable for use as protective covers for equipment and materials and for use in the geotextile sector.

An embodiment of the invention will now be more particularly described by way of example.

EXAMPLE 1

(Preparation of coating composition)

370.3 g of an aqueous dispersion (solids content: 54% by weight) of a vinyl chloride-ethylene copolymer with an ethylene content of 30% by weight were introduced as initial charge and 4.4 g of a melamine-formaldehyde resin (Cymel 327 from Dyno-Cyanamid) were added with stirring. Then 12.2 g of a polyacrylic acid (Latekoll D from BASF AG) and 200 g of water were added. While stirring the mixture vigorously, 100 g of aluminum oxide hydrate (Martinal OL 111 from Omnya) were mixed in and then 275 g of water were added. Finally, 26.3 g of a fatty acid salt mixture (Plex 6112S from Rohm GmbH) and 6.0 g of a black pigment (Imperon Black from Hoechst AG) were mixed in. The coating composition had a viscosity of 2600 mPa.s.

EXAMPLE 2

(Production of coated web)

The coating composition of Example 1 was mechanically foamed in a Mathis mixer (foam weight see Table 1) and the foam was applied to an approximately 100 g/m² polypropylene spunbonded (Typar, DuPont). On the underside of the spunbonded the foam was applied at the rate indicated in Table 1 by means of an air knife. On the upper surface of the web the foam was applied with a roller doctor (Variopress from Zimmer) with the foam height and at the application rate indicated in Table 1. Then the coated webs were dried in three stages at 70° C., 90° C. and 130° C. in a heating duct 9.6 m in length under a slow air stream. The foam applied to the upper surface of the web was finally compressed with a hot calender at 120° C. under a nip pressure of 3.5 kN and at a web speed of 1 m/min.

Application testing:

The coated webs produced as described in Example 2 were tested in respect of watertightness, water vapor permeability and flame retardance by the following methods. The results are listed in Table 1.

Watertightness (DIN 53886):

A coated web 13 cm in diameter is clamped between 2 sealing rings over an opening. The opening sits over a bubble-free water column connected to a water-filled reservoir vessel, which is continuously raised, thereby continuously raising the water pressure being exerted on the test specimen. The watertightness of the test specimen is reported in Table 1 as the length of water column (hydrostatic head) at which the third drop of water passes through the web.

Water vapor permeability (DIN 53122):

A dish with absorbent was covered with the web and sealed with wax at the edges. The amount of water vapor which diffuses through the web in the course of 24 hours' storage under standardized conditions of 25° C. and 75% atmospheric humidity was determined from the increase in the weight of the dish and extrapolated to a web area of 1 m$^2$. Table 1 gives the water vapor permeability in g/m$^2$×d.

Flammability rating (DIN 4102 Part 1):

An upright sample of the coated web is subjected at its lower edge to the application of a flame 20 mm in length from a burner held at 45°. To be classified under DIN 4102 as building material class B2, the flame must not reach a mark 15 cm away from the lower edge within 30 seconds. The values reported in Table 1 are averages from 5 measurements and indicate the time at which the flame became extinguished without having reached the mark.

TABLE 1

| Trial number* | Doctor gap (foam height) [mm] | Application rate [g/m$^2$] | Foam weight [g/l] | Water-tightness [mm of H$_2$O] | Water vapor permeability [g/m$^2$ × d] | Burning test Time to extinction [s] |
|---|---|---|---|---|---|---|
| 1(T) | 0.5 | 40 | 240 | 440 | >300 | 9 |
| (U) | air knife | 12 | 270 | | | |
| 2(T) | 0.8 | 82 | 260 | 390 | >350 | 14 |
| (U) | air knife | 13 | 160 | | | |
| 3(T) | 0.7 | 50 | 220 | 365 | >500 | 3 |
| (U) | air knife | 11 | 290 | | | |
| 4(T) | 0.6 | 40 | 220 | 315 | >500 | 27 |
| (U) | air knife | 10 | 350 | | | |

*(T) = topside, (U) = underside

What is claimed is:

1. A process for manufacturing a watertight, vapor permeable and flame-retardant coated support material consisting of the steps of
   1) foaming by mechanical means into a stable foam, a coating composition comprised of:
      A) an aqueous dispersion i) having a solids content of from 30 to 70% by weight of a vinyl chloride copolymer consisting essentially of 20 to 90% by weight of vinyl chloride, based on the total weight of the copolymer,
         from 10 to 80% by weight, based on the total weight of the copolymer, of at least one comonomer selected from the group consisting of the (meth) acrylic esters of alcohols of from 1 to 10 carbon atoms, the vinyl esters of saturated aliphatic carboxylic acids of from 2 to 10 carbon atoms, and the α-olefins and
         from 0 to 10% by weight, based on the total weight of the copolymer, of at least one ethylenically unsaturated functional comonomer selected from the group consisting of monocarboxylic acids, dicarboxylic acids, amides of monocarboxylic acids, amides of dicarboxylic acids, hydroxy functional monomers and sulfonate-functional monomers, or an aqueous dispersion ii) having a solids content of from 30 to 70% by weight of a vinyl acetate-ethylene copolymer consisting essentially of 10 to 40% by weight of ethylene, based on the total weight of the copolymer, and
         from 0 to 10% by weight, based on the total weight of the copolymer, of at least one ethylenically unsaturated functional comonomer selected from the group consisting of monocarboxylic acids, amides of monocarboxylic acids, dicarboxylic acids, amides of dicarboxylic acids, hydroxy-functional monomers and sulfonate-functional monomers.
      B) from 5 to 70% by weight based on the solids content of the aqueous dispersion A of the flameproofing agent selected from the group consisting of antimony oxides, phosphoric esters, zinc borates, metallic oxide hydrates, metal hydroxides and chloroparaffins,
      C) from 0 to 20% by weight based on the solids content of the aqueous dispersion A, of a crosslinker,
      D) from 0.5 to 20% by weight, based on the solids content of the aqueous dispersion A, of a foam stabilizer,
      E) from 0 to 10% by weight, based on the solids content of the aqueous dispersion A, of a thickener,
   2) applying the foam to form a foam layer on at least one side of a support material selected from the group consisting of woven, knitted and a nonwoven support material to form a coated support material and drying the coated material at a temperature of from 60° to 180° C., and
   3) after drying the coated support material, crushing the foam layer on at least one side of the coated support material by hot calendaring the coated support material under a nip pressure of from 2 to 300 daN/cm.

2. The process of claim 1, wherein the support material is made of woven, knitted or nonwoven textile support materials, comprising synthetic fibers.

3. The process of claim 1, wherein the support material is a spun-bonded material comprising at least one fiber selected from the group consisting of polyethylene fiber, polypropylene fiber, polyester fiber and glass fibers.

4. The process of claim 1, wherein the foam is applied at a rate of from 20 to 150 g/m$^2$, with a layer thickness of from 0.3 to 1.0 mm on a side.

5. The process of claim 1, wherein the foam is applied to both sides of the support material in a different layer thickness, to a first side of the support material in a layer of not more than 0.4 mm in thickness and to a second side of the support material in a thickness of from 0.3 to 1.0 mm.

6. The process of claim 1, wherein the foam layer on only one side of the coated support material is crushed.

7. The process of claim 1 wherein the copolymer of said copolymer dispersion i) consists essentially of from 10–50% by weight of ethylene, from 50 to 90% by weight of vinyl chloride and 0 to 10% by weight, based on the total weight of the copolymer, of at least one ethylenically unsaturated functional comonomer selected from the group consisting of monocarboxylic acids, dicarboxylic acids, amides of monocarboxylic acids, amides of dicarboxylic acids, hydroxy-functional monomers and sulfonate functional monomers.

8. The process of claim 1 wherein the copolymer of said copolymer dispersion i) consists essentially of from 20 to 50% by weight of vinyl chloride, 50 to 80% by weight of vinyl ester and 0 to 10% by weight, based on the total weight of the copolymer, of at least one ethylenically unsaturated functional comonomer selected from the group consisting of monocarboxylic acids, dicarboxylic acids, amides of monocarboxylic acids, amides of dicarboxylic acids, hydroxy-functional monomers and sulfonate functional monomers.

9. The process of claim 8 wherein the vinyl ester is vinyl acetate.

10. The process of claim 1 wherein the copolymer of said copolymer dispersion i) consists essentially of 50 to 70% by weight of vinyl chloride, 10 to 30% by weight of a vinyl ester, 5 to 15% by weight of ethylene and 0 to 10% by weight, based on the total weight of the copolymer, of at least one ethylenically unsaturated functional comonomer selected from the group consisting of monocarboxylic acids, dicarboxylic acids, amides of monocarboxylic acids, amides of dicarboxylic acids, hydroxy-functional monomers and sulfonate functional monomers.

11. The process of claim 1 wherein the copolymer of said copolymer dispersion i) or ii) consists essentially of up to 10% by weight of N-methylol (meth) acrylamide comonomers based on the total weight of the copolymer.

12. The process of claim 1 wherein the copolymer of said copolymer dispersion i) consists essentially of from 60 to 90% by weight of vinyl chloride, 10 to 40% by weight of ethylene and 1.5% by weight of N-methylol methacrylamide based on the total weight of the copolymer.

13. The process of claim 1 wherein the copolymer of said copolymer dispersion i) consists essentially of from 60 to 90% by weight vinyl chloride, 10 to 40% by weight of ethylene and 0 to 10% by weight, based on the total weight of the copolymer of at least one ethylenically unsaturated functional comonomer selected from the group consisting of monocarboxylic acids, dicarboxylic acids, amides of monocarboxylic acids, amides of dicarboxylic acids, hydroxy-functional monomers and sulfonate functional monomers.

14. The process of claim 1 wherein the copolymer of said copolymer dispersion i) consists essentially of from 20 to 50% by weight of vinyl chloride, 50 to 80% by weight of vinyl ester, 5 to 20% by weight (meth) acrylic ester and 0 to 10% by weight, based on the total weight of the copolymer, of at least one ethylenically unsaturated functional comonomer selected from the group consisting of monocarboxylic acids, dicarboxylic acids, amides of monocarboxylic acids, amides of dicarboxylic acids, hydroxy-functional monomers and sulfonate functional monomers.

15. A process for manufacturing a watertight, vapor permeable and flame-retardant coated support material consisting of the steps of 1) foaming by mechanical means into a stable foam, a coating composition comprised of:

A) an aqueous dispersion i) having a solids content of from 30 to 70% by weight of a vinyl chloride copolymer consisting essentially of 20 to 90% by weight of vinyl chloride, based on the total weight of the copolymer.

from 10 to 80% by weight, based on the total weight of the copolymer, of at least one comonomer selected from the group consisting of the (meth) acrylic esters of alcohols of from 1 to 10 carbon atoms, the vinyl esters of saturated aliphatic carboxylic acids of from 2 to 10 carbon atoms, and the α-olefins, and from 0 to 10% by weight, based on the total weight of the copolymer, of at least one ethylenically unsaturated functional comonomer selected from the group consisting of monocarboxylic acids, dicarboxylic acids, amides of monocarboxylic acids, amides of dicarboxylic acids, hydroxy functional monomers and sulfonate-functional monomers, or an aqueous dispersion ii) having a solids content of from 30 to 70% by weight of vinyl acetate-ethylene copolymer consisting essentially of 10 to 40% by weight of ethylene, based on the total weight of the copolymer, and from 0 to 10% by weight, based on the total weight of the copolymer, of at least one ethylenically unsaturated functional comonomer selected from the group consisting of monocarboxylic acids, amides of monocarboxylic acids, dicarboxylic acids, amides of dicarboxylic acids, hydroxy-functional monomers and sulfonate-functional monomers, B) from 5 to 70% by weight based on the solids content of the aqueous dispersion A of a flameproofing agent selected from the group consisting of antimony oxides, phosphoric esters, zinc borates, metallic oxide hydrates, metal hydroxides and chloroparaffins, C) from 0 to 20% by weight based on the solids content of the aqueous dispersion A, of a crosslinker, D) from 0.5 to 20% by weight, based on the solids content of the aqueous dispersion A, of a foam stabilizer, E) from 0 to 10% by weight, based on the solids content of the aqueous dispersion A, of a thickener, 2) applying the foam to form a foam layer on at least one side of a support material selected from the group consisting of woven, knitted and a nonwoven support material to form a coated support material and drying the coated support material at a temperature of from 60° to 180° C., 3) after drying the coated support material, crushing the foam layer on at least one side of the coated support material by hot calendaring the coated support material under a nip pressure of from 2 to 300 daN/cm, and 4) applying a further coat of an unfoamed copolymer dispersion of the composition of the copolymer dispersion i) or ii) to at least one coated side of the coated support material.

* * * * *